Jan. 5, 1943.          O. H. LUDEMAN          2,307,628
                        VALVE MECHANISM
                     Filed Dec. 2, 1941           3 Sheets-Sheet 2

INVENTOR
Oscar H. Ludeman.
BY
Liddle, Buell and Montgomery
ATTORNEYS.

Patented Jan. 5, 1943

2,307,628

UNITED STATES PATENT OFFICE 2,307,628

VALVE MECHANISM

Oscar H. Ludeman, New York, N. Y.

Application December 2, 1941, Serial No. 421,274

3 Claims. (Cl. 137—139)

This invention is directed to an improvement in valve mechanisms, and has for one of its objects the provision of a valve construction which I believe to be new and novel and which I know possesses distinct advantages over valve mechanisms as constructed heretofore for the same duty.

More specifically the invention provides a new and novel construction in valves in that the valve is spring opened; a clearance piston actuated by the pressure of the fluid being controlled is provided for closing the valve. By employing a clearance piston—that is, a piston which is always out of contact with its cylinder walls—for closing the valve I eliminate the danger of sticking of the valve in open position, and by the same token I am able to handle all types of fluids.

Other objects and advantages of the invention will be apparent as my description proceeds.

Figure 1:
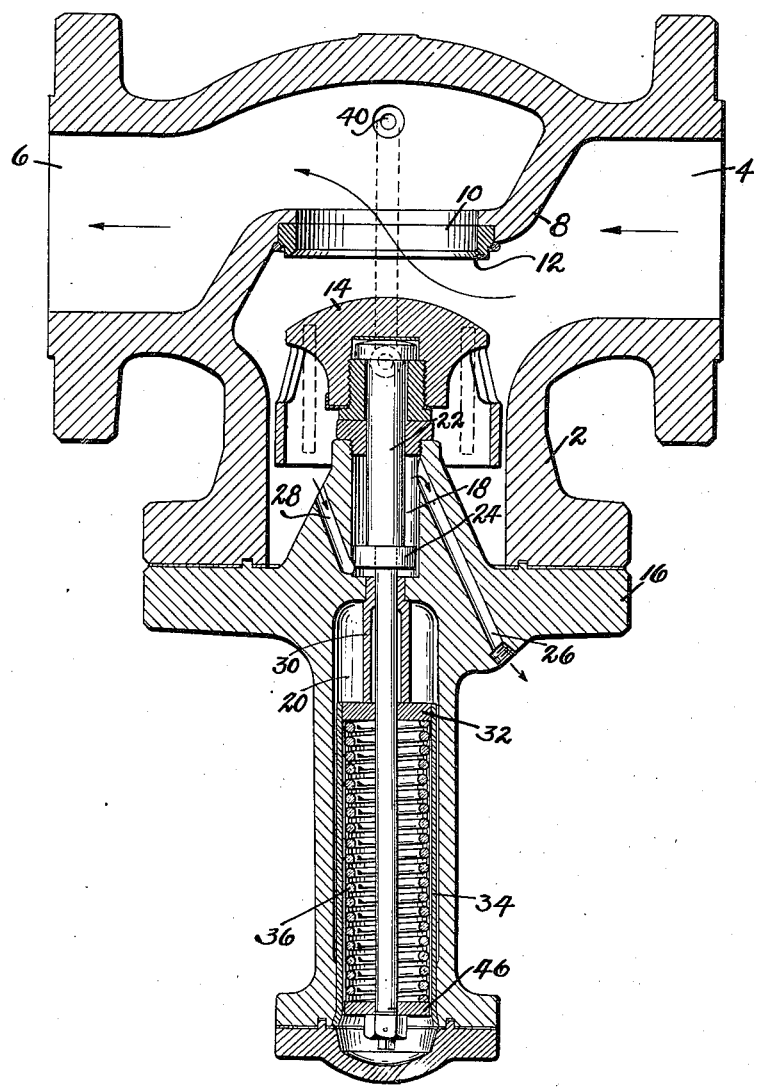
Fig. 1 is a sectional elevational view of one embodiment of the invention.

Referring to the drawings in detail and first of all to the embodiment of the invention illustrated in Fig. 1: 2 designates the valve body having inlet 4 and discharge 6 separated by diaphragm 8 equipped with valve opening 10 therethrough. The diaphragm is provided with valve seat 12 for the stop valve 14.

Secured to the lower end of the valve body 2 is a casting 16, in the upper end of which I provide a cylinder 18, and in the lower part of which I provide spring chamber 20 which is in axial alignment with the cylinder 18.

22 designates the stem for the valve 14. This stem extends through the cylinder 18 and into the spring chamber 20.

That part of the valve stem lying within the cylinder 18 is equipped with a clearance piston 24, that is to say, a piston which has no frictional contact with the wall of the cylinder, thereby eliminating all source of friction between piston and cylinder wall.

The casting 16 is provided with a pressure release port or duct 26, leading from the top of the cylinder 22 to the outside of the casting 16. This port or duct in practice is equipped with any suitable valve arrangement whereby the duct can be controlled manually or automatically as may be desired.

The casting 16 is also equipped with another duct or port 28 leading from the bottom of the cylinder 18 below the clearance piston 24 to the outside of the casting 16 within the valve body 2, so that the fluid under pressure to be controlled by the valve 14, steam, for example, may flow into the cylinder 18 under all conditions.

The valve stem 22 where it passes from the cylinder 18 to the spring chamber 20 extends through a thimble 30 which is mounted at the top of the chamber. This thimble functions as a guide for the stem. No packing is necessary.

At the lower end of the thimble 30, integral therewith if desired, is a member 32 extending across the spring chamber. This member is across the top of a sleeve 34 fixed in the spring chamber. On the valve stem and within the sleeve 34 is valve-opening spring 36, its upper end contacting the member 32, and its lower end contacting a disc 46 mounted at the lower end of the valve stem.

The sole function of the spring 36 is to open the valve 14 and hold it open. As the parts are shown in the drawings the valve 14 is open, and is being held open by the spring. At this time the cylinder 18 is under line pressure inasmuch as the cylinder is in direct communication with the fluid inlet 4. When the valve is to be closed it is merely necessary to open the pressure release line 26 so that the pressure on top of the piston 24 plus the resistance of the spring 36 is no longer as great as the pressure on the underside of the piston, with the result that the valve will close under the action of the pressure of the steam or other fluid to be controlled. When valve 14 is seated, it is appreciated that the same becomes unbalanced, that is, the total pressure at the inlet side of the valve to hold it closed is greater than the pressure on the discharge side plus the energy stored in the spring 36. The valve will remain closed as long as this condition exists, even though the pressure release 26 is closed again as soon as the valve is seated. It is to be understood of course that the total clearance between the piston 24 and the wall of the cylinder 18 is amply less than the area in the pressure release line 26 so as not to interfere with the described closing of the valve.

40 designates a by-pass adapted to be opened and closed manually or automatically as may be desired and provided for the purpose of admitting pressure fluid to the discharge side of the valve opening 10 when the valve 14 is seated. Of course when the valve 14 is closed and it is to be kept closed, this by-pass valve is closed. In other words, with the by-pass valve 40 and the main valve 14 closed, and with the pressure relief line 26 closed, the valve 14 is unbalanced in a direction to hold it closed and the energy stored in the spring 36 is insufficient to overcome this unbalance and open the valve. Consequently when it is desired to reopen the valve 14 the by-pass valve 40 is opened and as soon as the pressure on the two sides of the valve 14 is substantially equalized the valve will be moved to open position by the opening spring 36 and will be held in open position by the spring until the pressure in the release line 26 is again released.

It is to be understood that the fluid under pressure which is to be controlled by the valve 14 is not necessarily steam.

I appreciate that, due to my construction, the spring 36 is in the pressure fluid, in that there is no packing between the valve stem 22 and thimble 30 and abutment member 32, but while this is a fact it is also true that my construction is such that the spring will not be subjected to excessive temperatures when a high temperature fluid such as steam, for example, is being handled, in that the spring is in a temperature zone materially below the temperature of the circulating fluid. In other words, the spring might be said to be in a dead temperature zone as distinguished from the active zone through which the pressure fluid circulates.

Figure 2:
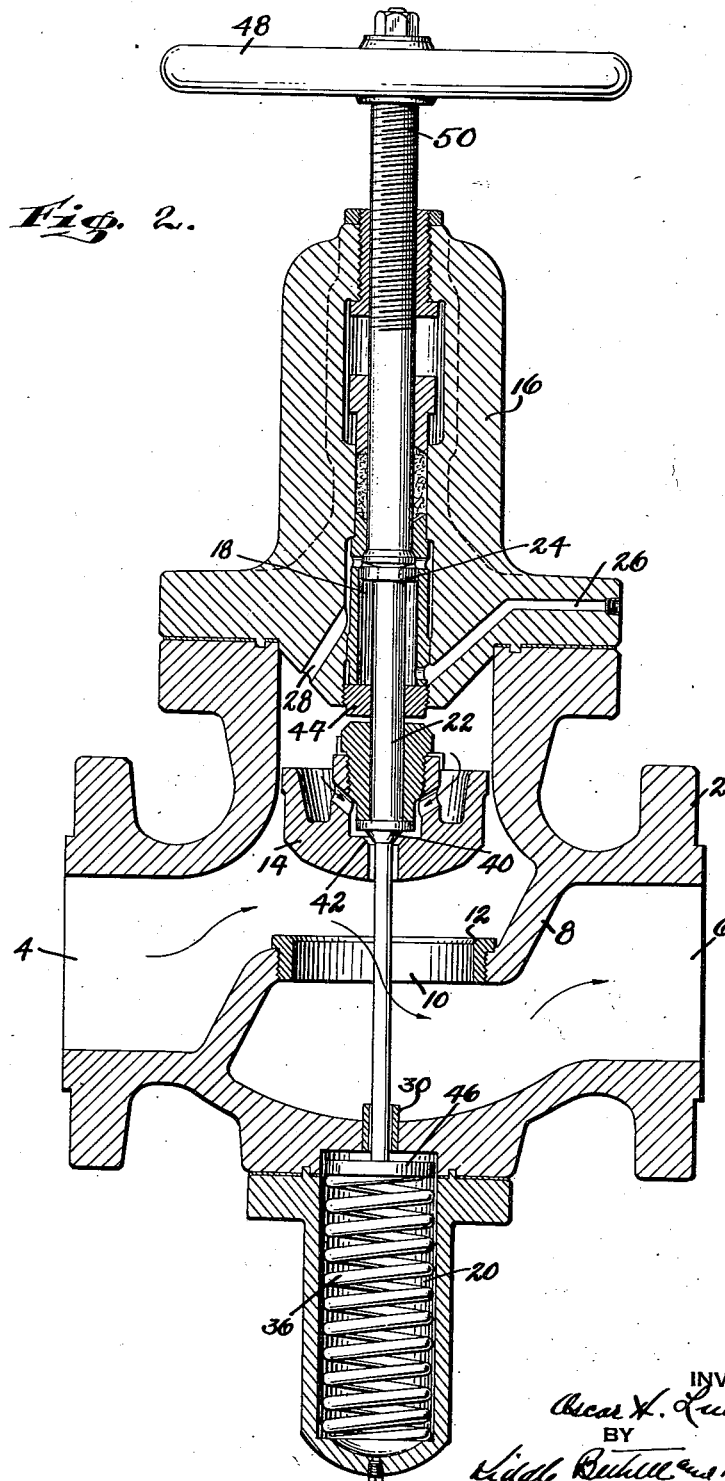
Fig. 2 is a similar view of another embodiment of the invention.

The embodiment of my invention as illustrated in Fig. 2 is very similar to that already described, and where feasible, like parts will be given like reference characters.

Referring to Fig. 2: The valve body 2 is provided with inlet 4 and discharge 6 separated by diaphragm 8, which, as in Fig. 1, is equipped with valve opening 10 therethrough. The valve seat in the valve opening 10 is designated 12.

The main valve 14 in this instance is equipped with a by-pass valve 40 built into the main valve, its seat 42 being formed in the main valve. 18 designates a cylinder formed in the casting 16 which is secured to the upper end of the valve body 2.

The valve stem 22 extends through the cylinder 18, through the main valve and valve opening 10 into spring chamber 20 provided in a casting secured to the lower end of the valve body 2.

The valve stem at its upper end, that is, that part of the stem which always extends into the cylinder 18 is equipped with a clearance piston 24. As its name implies this piston does not contact the walls of its cylinder.

26 is a pressure relief line formed in the casting 16 and extending from the lower end of the cylinder 18 to the exterior of the casting. This line is controlled by any suitable valve either manually or automatically opened and closed.

The casting 16 is also provided with pressure line 28 leading to the cylinder 18. The bottom of the cylinder 18 is provided with a plug 44. The valve stem 22 passes through this plug and is guided thereby. It is to be noted that this bearing is packless. The spring chamber 20 contains the valve-opening spring 36 which bottoms on the lower end of the chamber, the upper end of the spring abutting a disc 46 mounted on the lower end of the valve stem. This disc is not a fit in the spring chamber and it will be seen from the drawings also that the thimble 30 is merely a loose fit on the valve stem.

48 is a handwheel and 50 its stem for closing the by-pass valve 40 and main valve 14 manually although the valve 14 may be closed automatically, if desired, as will be hereinafter pointed out. The handwheel stem 50, as will be seen from the drawings, is threaded into the casting 16 and its lower end contacts the upper end of the valve stem 22.

The valve 14 is shown in open position. To close the valve it is merely necessary to turn down the handwheel 48 when the valve is to be closed manually. If the valve is to be closed by pressure fluid, it is merely necessary to open the pressure release line 26.

To open the main valve under the action of the spring 36, it is merely necessary to back off the spindle of the handwheel allowing the spring 36 to unseat the by-pass 40 and as soon as the valve 14 is balanced again due to this opening of the by-pass the main valve will be moved to open position under the action of the spring 36.

The embodiment of my invention illustrated in Fig. 3 will now be described. This valve mechanism is quite similar to that described in connection with Fig. 2.

2 designates the valve body which is equipped with diaphragm 8, valve opening 10 and valve seat 12. The main valve is designated 14. As in the embodiment of the invention illustrated in Fig. 2 the by-pass valve 40 is built into the main valve.

The stem for the main and by-pass valves is designated 22 and is equipped with clearance piston 24 in cylinder 18. Pressure fluid is admitted to this cylinder through port 28, while 26 designates a pressure relief line for the cylinder. This line, as already explained in connection with the other embodiments of my invention, is valve controlled manually and/or automatically.

The valve stem 22 in this embodiment of the invention is spring actuated by spring 36 to open the by-pass valve and the main valve through lever 60 pivoted at 62.

The handwheel 48 in this instance is adapted to actuate its spindle or rod 50 through toggles 64.

With the parts closed as shown in the drawings, it is merely necessary to open the main valve 14 to back off the handwheel spindle 50 to permit the spring 36 to open the by-pass valve 40. As soon as the main valve becomes substantially pressure balanced by reason of this opening of the by-pass the spring 36 will open the main valve.

In all three embodiments of my invention it will be seen that the valve is spring opened, closing of the valve being effected either manually or by fluid pressure on a clearence piston carried by the valve stem.

While in all three cases the opening spring is in the pressure fluid, it is located in a temperature zone materially lower than that of the pressure fluid circulating or flowing through the apparatus. In other words, the zone in which the opening spring is located may properly be termed a dead zone as distinct from the active zone through which the pressure fluid circulates.

It will be appreciated also that in all embodiments of the invention slamming of the main valve on its seat is reduced by the hydraulic choke piston effect provided by enclosing the opening spring along with its piston 46 in a dead-end or condensate cylinder which while nearly closed is nevertheless always in communication with the pressure fluid being controlled by the valve.

Figure 3:
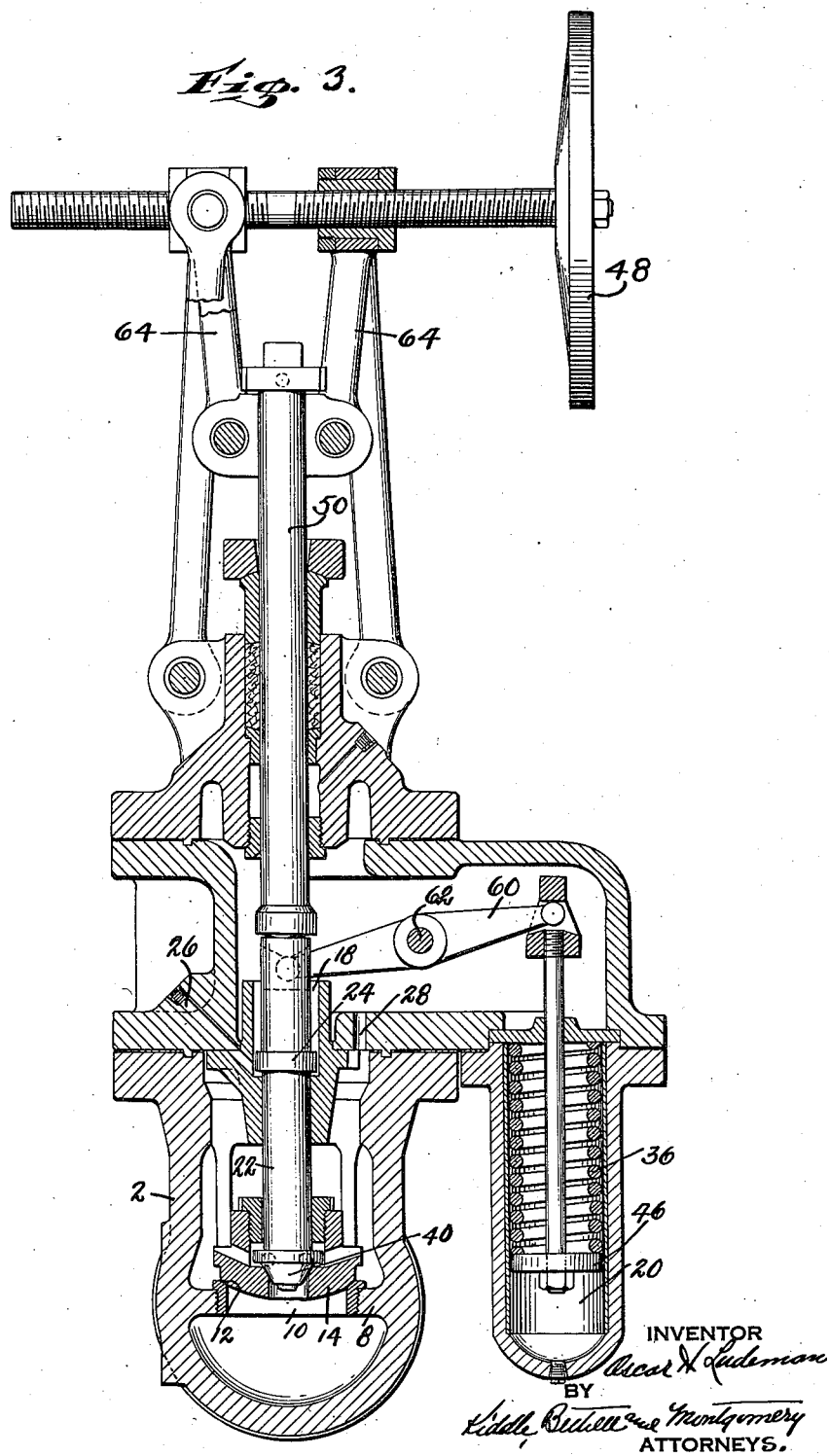
Fig. 3 is a sectional elevational view of a third embodiment of the invention.

In the embodiments of my invention as illustrated in Figs. 2 and 3, it will be understood that the operator can retract the handwheel spindle all the way, but only the by-pass valve will open until line pressure is established substantially balancing the main valve. Thus a careless operator is prevented from opening the main valve quickly on a cold line, a dangerous proceeding where hot fluids such as steam are being handled.

It is to be understood that my improved valve apparatus is suitable for handling pressure fluids of various kinds, and is not to be limited to the use of steam, for example.

Changes may be made in the details of construction and arrangement of parts within the purview of my invention.

What I claim is:

1. Valve mechanism for controlling the flow of pressure fluids, said mechanism comprising in combination a valve body having an inlet and an outlet for the pressure fluid to be controlled, a diaphragm within the valve body separating the said inlet and discharge, and equipped with a valve opening or port, a main valve for said opening seating in the direction of flow of pressure fluid through said opening, a port in said main valve extending from the pressure to the discharge side thereof, a second valve, built into the main valve, for controlling the port in the latter, said second valve being movable relatively to and seating in the same direction as the main valve, a valve stem common to both valves, a cylinder built into said valve body, a loose fit piston therein and carried by said valve stem, a pressure fluid inlet to said cylinder, at the outer face of said piston, from the valve body at the inlet side of the main valve, an exhaust or pressure relief for the cylinder at the opposite face of the piston, and a valve opening spring connected to said valve stem, for opening the second valve against the action of the fluid pressure thereon when said pressure relief is closed, thereby to equalize the fluid pressure at each side of the main valve to unseat the same.

2. Valve mechanism for controlling the flow of pressure fluids, said mechanism comprising in combination a valve body having an inlet and an outlet for the pressure fluid to be controlled, a diaphragm within the valve body separating the said inlet and discharge, and equipped with a valve opening or port, a main valve for said opening seating in the direction of flow of pressure fluid through said opening, a port in said main valve extending from the pressure to the discharge side thereof, a second valve, built into the main valve, for controlling the port in the latter, said second valve being movable relatively to and seating in the same direction as the main valve, a valve stem common to both valves, a cylinder built into said valve body, a loose fit piston therein and carried by said valve stem, a pressure fluid inlet to said cylinder, at the outer face of said piston, from the valve body at the inlet side of the main valve, an exhaust or pressure relief for the cylinder at the opposite face of the piston, a valve opening spring connected to said valve stem, for opening the second valve against the action of the fluid pressure thereon when said pressure relief is closed, thereby to equalize the fluid pressure at each side of the main valve to unseat the same, and a dead end or condensate cylinder always in communication with the pressure fluid being controlled by the main valve in which said spring is positioned.

3. Valve mechanism for controlling the flow of pressure fluids, said mechanism comprising in combination a valve body having an inlet and an outlet for the pressure fluid to be controlled, a diaphragm within the valve body separating the said inlet and discharge, and equipped with a valve opening or port, a main valve for said opening seating in the direction of flow of pressure fluid through said opening, a port in said main valve extending from the pressure to the discharge side thereof, a second valve, built into the main valve, for controlling the port in the latter, said second valve being movable relatively to and seating in the same direction as the main valve, a valve stem common to both valves, a cylinder built into said valve body, a loose fit piston therein and carried by said valve stem, a pressure fluid inlet to said cylinder, at the outer face of said piston, from the valve body at the inlet side of the main valve, an exhaust or pressure relief for the cylinder at the opposite face of the piston, a valve opening spring connected to said valve stem, for opening the second valve against the action of the fluid pressure thereon when said pressure relief is closed, thereby to equalize the fluid pressure at each side of the main valve to unseat the same, a dead end or condensate cylinder at the lower end of said valve stem and always in communication with the pressure fluid being controlled by the main valve, a loose fit piston on the valve stem and positioned in said cylinder, said spring being disposed in the cylinder between said piston and the closed end of said condensate cylinder, whereby slamming of the main valve on its seat is reduced.

OSCAR H. LUDEMAN.